United States Patent [19]

Kipnes

[11] Patent Number: 5,317,809
[45] Date of Patent: Jun. 7, 1994

[54] APPARATUS FOR MEASURING SCREW THREADS BY 3-WIRE METHOD

[76] Inventor: Hyman J. Kipnes, 54 Canterbury Dr., Hauppauge, N.Y. 11788

[21] Appl. No.: 972,248

[22] Filed: Nov. 5, 1992

[51] Int. Cl.$^5$ .............................................. G01B 5/16
[52] U.S. Cl. ................................ 33/199 R; 33/199 B; 33/829
[58] Field of Search ................. 33/199 R, 199 B, 815, 33/829, 828, 831

[56] References Cited

U.S. PATENT DOCUMENTS

| | | |
|---|---|---|
| 2,431,021 | 11/1947 | Bourdelais . |
| 2,692,438 | 10/1954 | Schneider . |
| 2,805,483 | 9/1957 | Zelnick ................................ 33/815 |
| 2,822,624 | 2/1958 | Klink ................................... 33/199 |
| 2,826,822 | 3/1958 | Noviant ........................... 33/199 R |
| 2,906,029 | 9/1959 | Croshier . |
| 2,939,220 | 6/1960 | Croshier . |
| 2,962,817 | 12/1960 | Varney . |
| 3,812,591 | 5/1974 | Michaud . |
| 4,480,388 | 11/1984 | O'Brien ........................... 33/199 R |
| 4,553,337 | 11/1985 | Brewster ......................... 33/199 R |
| 4,590,678 | 5/1986 | Arredondo ...................... 33/199 R |
| 4,777,361 | 10/1988 | Affa ..................................... 250/239 |
| 4,821,422 | 4/1989 | Porter .............................. 33/199 R |
| 4,939,845 | 7/1990 | Porter .............................. 33/199 R |
| 4,947,555 | 8/1990 | Allen ................................ 33/199 R |
| 5,175,935 | 1/1993 | Welter ............................. 33/199 R |

FOREIGN PATENT DOCUMENTS 555830 9/1943 United Kingdom ................... 33/829
583385 1/1946 United Kingdom ............... 33/199 R

OTHER PUBLICATIONS

"The Mahr Gage Calibration Center" Advertisement, Mahr Gage Co., 274 Lafayette Street, New York, N.Y. 10012 (no date).
"Mahr Dimensional Metrology, Measuring Instruments, Measuring Machines, Gauges", Catalog, Mahr Gage Co., New York, N.Y. pp. 45, 49, 230 (no date).
Machinery Handbook, Measuring Screw Threads, pp. 1668–1687 (no date).
U.S. Dept. of Commerce, National Bureau of Standards, Handbook H28 Screw-Thread Standards for Federal Services, Appendix A4, 1969.

Primary Examiner—William A. Cuchlinski, Jr.
Assistant Examiner—Alvin Wirthlin
Attorney, Agent, or Firm—Alfred M. Walker

[57] ABSTRACT

An apparatus for holding wires for measuring screw threads by the three wire method includes a body portion and a plurality of wire holder ears in a vertical position, the wire holding ears being responsive to rotational movement and the wire holder ears being limited in the rotational movement by weighted lower base portions provided on the bottom of the wire holder ears. A ledge is provided for holding the screw in position perpendicular to the orientation of the three wires in a position for the pitch diameter of the screw threads to be measured.

24 Claims, 6 Drawing Sheets

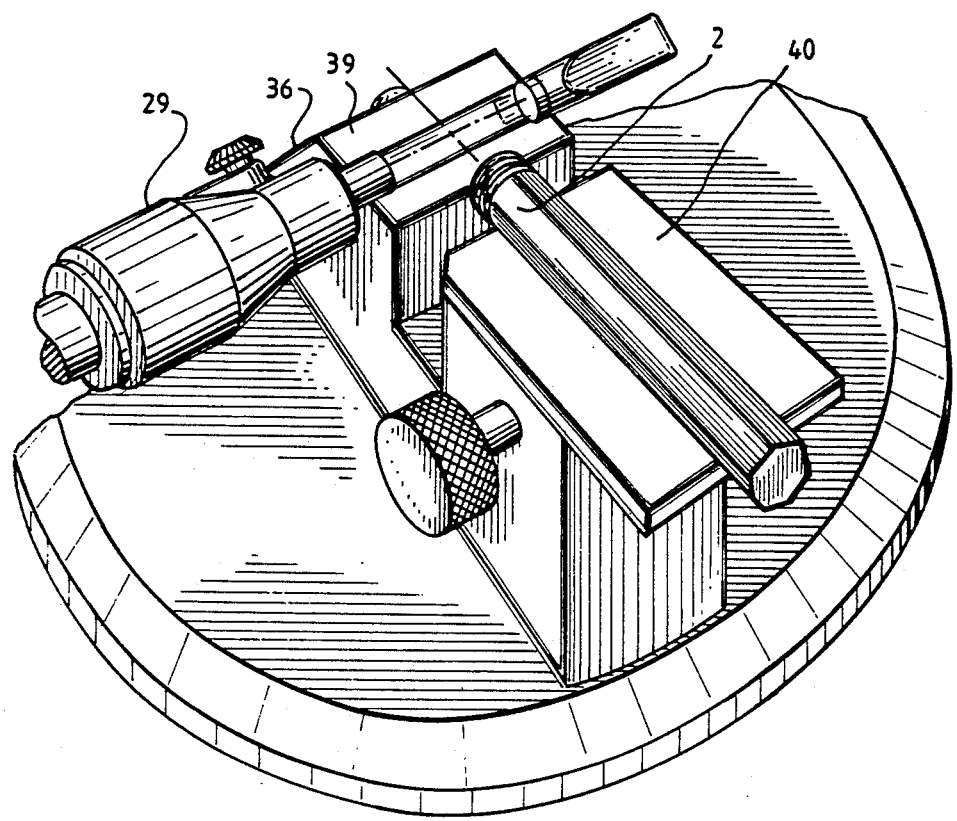
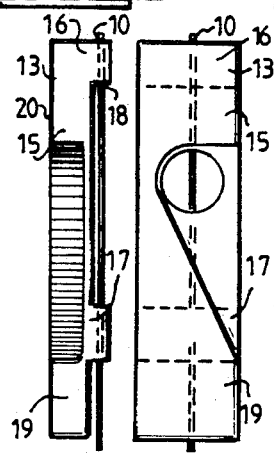
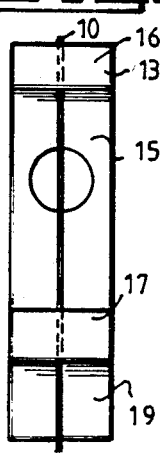
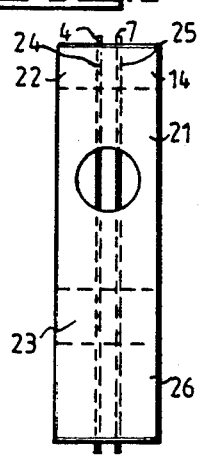
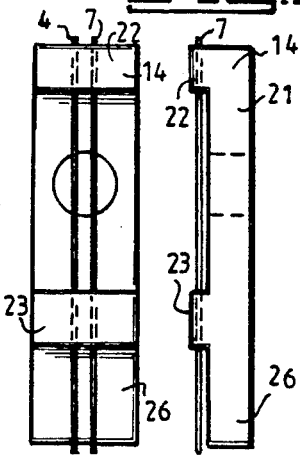

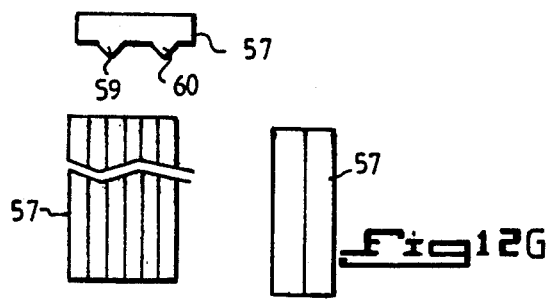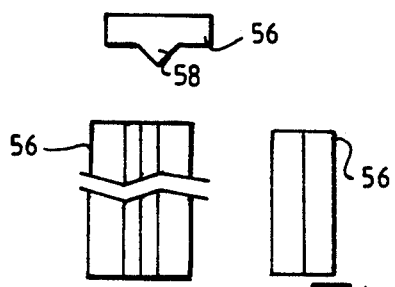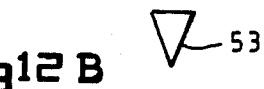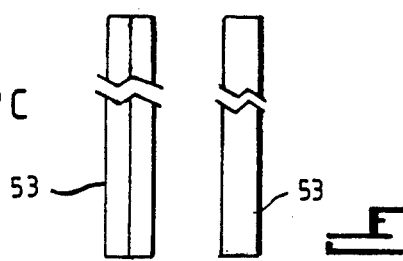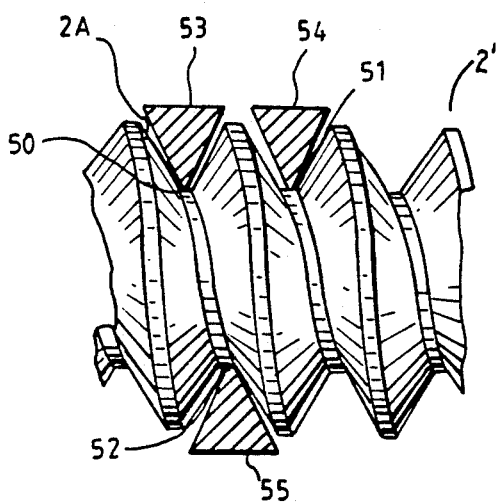

APPARATUS FOR MEASURING SCREW THREADS BY 3-WIRE METHOD

FIELD OF THE INVENTION

This invention relates to an apparatus for measuring the pitch diameter of screw threads, by utilizing the traditional three-wire method, in which wires are optimally held in place within the flanks of screw threads during measurement, without shifting and deviation from preferred orientation of wires within respective screw threads.

BACKGROUND ON THE INVENTION

In order to provide for accurate tightening of screws, screw threads must be meticulously measured for uniformity. The "pitch" of a screw thread is the distance between a point on a screw thread and the corresponding point on the adjacent thread in a line parallel with the axis of the screw. Moreover, the "pitch diameter" of a screw is the diameter of a screw measured from a midpoint on the flank surface of a screw thread through the screw to an opposite midpoint on a flank of the screw thread of the screw, in a direction perpendicular to the axis of the screw. In other words, on a straight thread, the pitch diameter is the diameter of the cylinder whose surface passes through the thread profiles at such points as to make the widths of thread groove and thread ridge equal.

In addition to pitch diameter, the major diameter of a screw thread, which is the distance from the outside of one side of the screw thread to the opposite side, is conventionally measured by a standard micrometer.

The minor diameter, however, which is the diameter from the interior base of the screw thread to an opposite interior base of the screw thread, is conventionally measured by a ring gauge, which follows the surface of the thread.

Various methods have been provided for measuring screw threads by using these aforementioned three wires for measuring the pitch diameter of the screw threads. Screw threads are measured in accordance with United States Department of Commerce, National Bureau of Standards HANDBOOK H28, entitled "Screw-Thread Standards For Federal Services- Appendix For Methods of Wire Measurement of Pitch Diameter of 60 degree Threads". According to the federal standards, the measurement of the pitch diameter, that is the distance between the centers of two adjacent screw threads, the measurement must be accurate with no room for movement of the wires, which are placed upon the flank surfaces within the screw threads for the purpose of measuring the pitch and the pitch diameter.

It is further noted that while the aforementioned appendix applies to 60 degree threads, other angled threads are similarly measured.

In a typical orientation one elongated center wire is placed upon the flank surfaces within the tapered walls of the screw thread. Opposite to this center wire are two offset wires upon the flank surfaces in the corresponding tapered walls between the threads of the screw.

Typically small hardened steel longitudinally extending cylinder wires are placed in the thread groove, the two offset wires on one side of the screw and the one single center wire on the opposite side. In the prior art, various holders are described for holding the wires within a micrometer anvil so that one holder, such as that having the two offset wires, is advanced towards the opposite holder with the center wire.

As noted above, the wires should be placed such that the outside circumference of the cylindrical wire touches exactly the mid slope of the flank of the thread of a given pitch. In the prior art, in order to hold the wires exactly in the proper measuring position, two movable holding members, such as rubber bands or springs, are typically used to hold the wires still in place during the measurement of the screw threads. However, use of the "movable" holders, such as rubber bands or springs, is frowned upon in government standards as well as in standard engineering texts, such as the *Machinery Handbook*, which notes that the three measuring wires should be firmly held in place during measurement.

When standard micrometers are used, however, often the use of the three-wire method for measuring screw threads is an unwieldy manual process, in which the user must hold the anvil of the micrometer in one hand, as well as the holders for the three wires, while the other hand moves the handle to rotate the spindle of the micrometer and thereby move the double offset wires towards the single center wire.

Various devices have been patented to attempt to use the three-wire method for measuring screw threads. Among these are U.S. Pat. Nos. 2,431,021 of Bourdelais, 2,939,220 of Croshier, 2,822,624 of Klink, 2,692,438 of Schneider, 2,906,029 also of Croshier, 2,962,817 of Barney, 4,480,388 of O'Brien, 4,821,422 of Porter and 4,939,845 also of Porter.

These patents generally disclose wire holding attachments for the three-wire method of measuring pitch diameters of screw threads. However, some of the known devices have significant disadvantages, such as the fact that the devices cannot hold the three wires firmly in place, within the screw threads, because of the use of springs which, as the springs are compressed smaller, results in the likelihood that there is increasing pressure upon the three wires, which may result in the possibility of the dislodging of the wires.

Such use of springs is disclosed in the Croshier '220 and '029 patents. In Croshier '220, two off-set wires, which are held in place against the screw threads, are movable, which can cause inaccuracies of the measurements. Likewise, in Croshier '029, the wires are held apart by a hub, so that the wire pins float, and are not locked in a solid position against the flank surfaces within the screw threads.

Furthermore, in Croshier '220, the holes holding the wires are larger than the diameter of the cylindrical wires, which may cause the wires to shift while conforming to the flank surfaces of the screw threads. The shifting may result in inaccurate measurements and is therefore contraindicated according to the aforementioned Federal standards and engineering handbooks.

Moreover, O'Brien '388 requires a flexible holder, such as a rubber band, which is not permitted under the federal *Handbook H28*.

The remaining patents have complicated moving parts and springs, which do not provide for accurate measurement of screw threads. Another problem with the prior art devices, such as O'Brien '388, is that they do not have a positive means for the wires to adjust to the lead angle of the threads being measured.

In an unpatented prior art publication, there is shown a three wire measuring system in the catalog of the Mahr Gage Co., Inc. of 274 Lafayette St., New York, N.Y., which defines a calibration device which includes a pair of holder ear pieces for holding the respective center wire and two off-set wires against the screw threads at opposite sides of the screw threads being measured. In the Mahr system, the two sets of wires move in place as the spindle of a micrometer is advanced towards the other wire holder with the single center wire.

The disadvantage of the Mahr device is that the wires are advanced towards each other in a horizontal orientation, thereby resulting in the possibility of inaccuracies, because of the effect of gravity upon the horizontally oriented holder ear pieces for the wires. In the Mahr the wires are solely held in place against gravity in a horizontal position by the wire holder ears. Moreover, in the Mahr device the wires are held in place in one location within the holder ear pieces, so that if the wire tends to wear out where it is being used to measure on a frequent basis, the wires cannot be moved in an axial direction so as to expose a further portion of the wire, which is not worn, out to the screw threads.

Moreover, a further disadvantage of the prior art is the use of a complicated ring gauge, which must travel the length of the screw threads, to measure the minor diameter of the screw threads.

OBJECTS OF THE INVENTION

Therefore, it is an object of the present invention to provide an apparatus for the three-wire measurement of screw threads using a standard hand-held micrometer, in which the improvement lies in the generally vertical orientation of the wires, within a restricted rotational field, to keep the wires from spinning 360 degrees, and thereby causing measurement inaccuracies.

A further object of the present invention to provide an apparatus for measuring screw threads with the three-wire method, in which the wires are limited in their rotation.

A further object of present inventions is to provide an apparatus for automatically aligning up wires of a three-wire method for measuring screw threads.

It is a further object of the present invention to provide for a means for holding the screw with the screw threads being measured in a horizontal position, to accommodate the vertically oriented three measuring wires.

It is a further object of the present invention to provide a means for moving the wires in between uses.

It is a further of object of the present invention to accurately measure the minor diameter of screw threads.

It is a further object of the present invention to improve over the disadvantages of the prior art.

SUMMARY OF THE INVENTION

In keeping with the foregoing objects and others which may come apparent, there is provided an apparatus for accurately moving wires for measuring screw threads efficiently into a vertical orientation for measuring the pitch diameter of the screw threads, wherein the wires are limited in their rotation away from a vertical axis of orientation, as noted in the appended drawings.

A more complete understanding of this invention can be obtained from the following detailed description of the drawings, in which, when read in conjunction with the accompanying drawings, similar elements are referred to and indicated by referenced numerals.

BRIEF DESCRIPTION OF DRAWINGS

FIG. 5 is a further close-up perspective view of the apparatus of the present invention as shown in FIG. 1.

FIGS. 6-8 are side, rear and front elevational views of a wire holder for a single center wire of the apparatus of the present invention.

FIGS. 9-11 are rear, front and side elevational views of a wire holder ear for two off-set wires of the apparatus of the present invention.

FIG. 12A is a close-up view of a typical screw with the minor diameter of screw threads being measured by the present invention.

FIGS. 12B-12D are top, front and side views of a tapered wire used in conjunction with measuring the minor diameter of screw threads, as shown in FIG. 12A.

FIGS. 12E-12G are top, front and side views of an alternate embodiment of the screw thread engaging portion of the present invention.

FIGS. 12H-12J are top, front and side views of a further alternate embodiment of the screw thread engaging portion of the present invention.

DETAILED DESCRIPTION OF A PREFERRED EMBODIMENT

Figure 1:
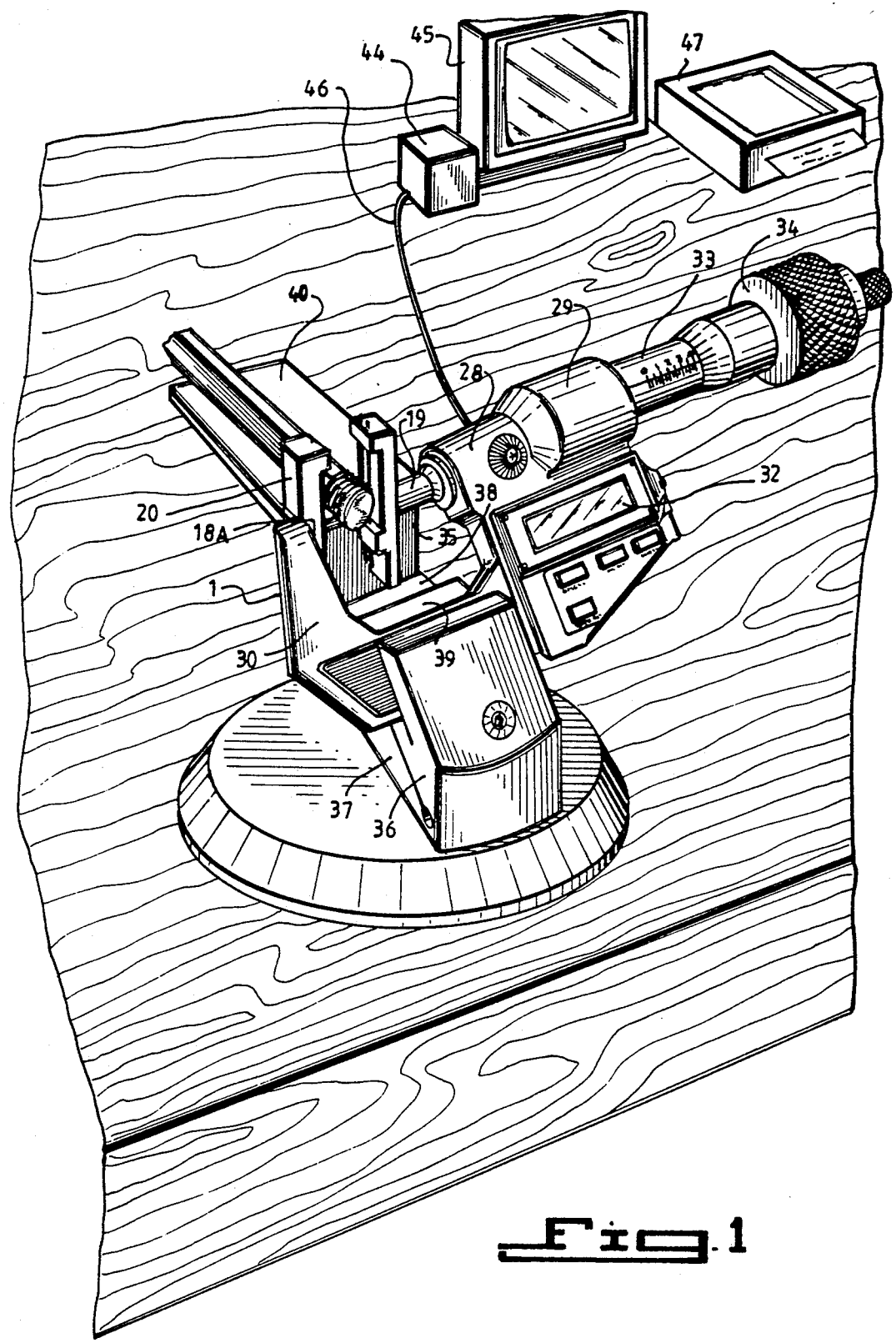
FIG. 1 is a perspective view of the apparatus of the present invention.
Figure 2:
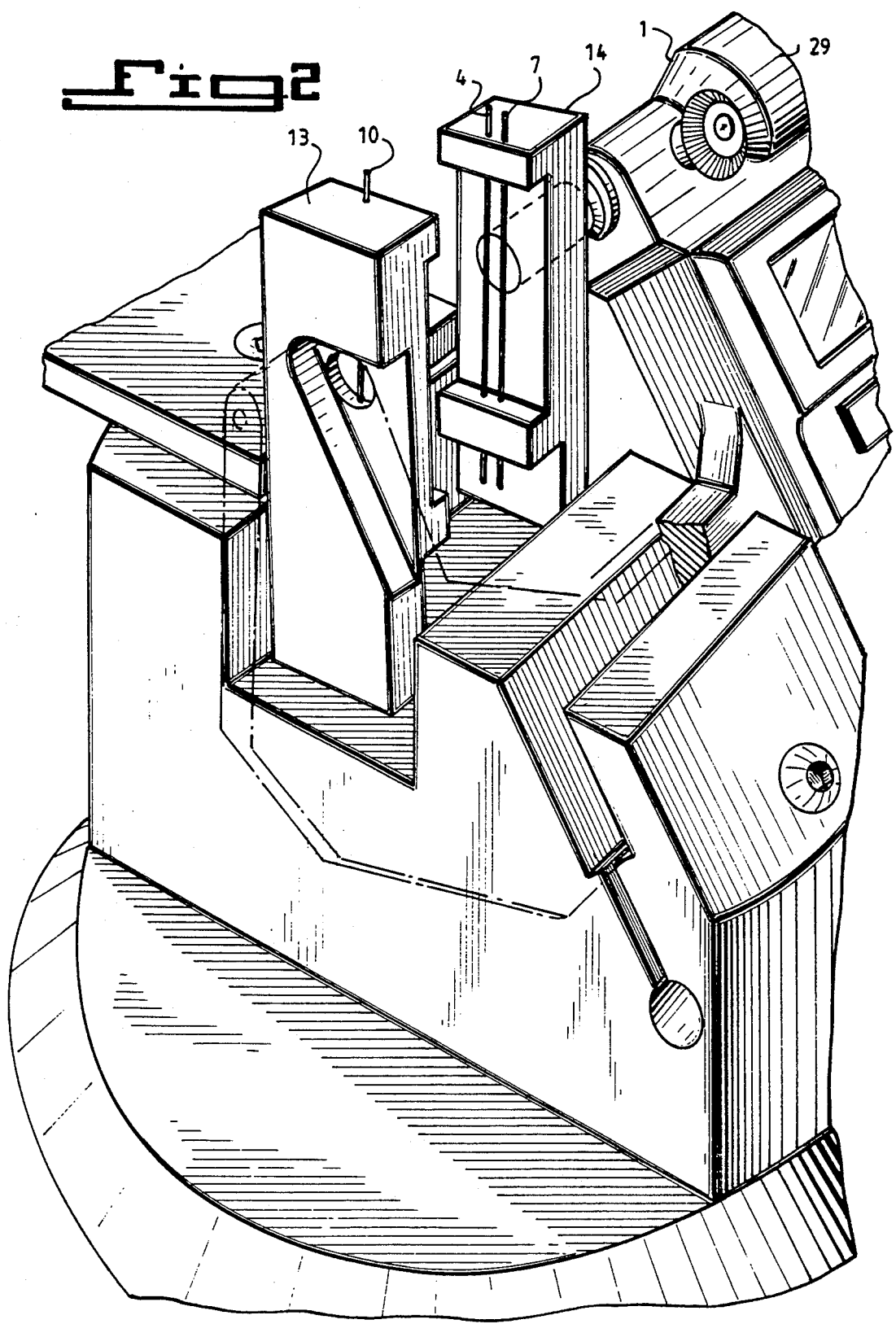
FIG. 2 is a close-up perspective view of the apparatus of the present invention as shown in FIG. 1.
Figure 3:
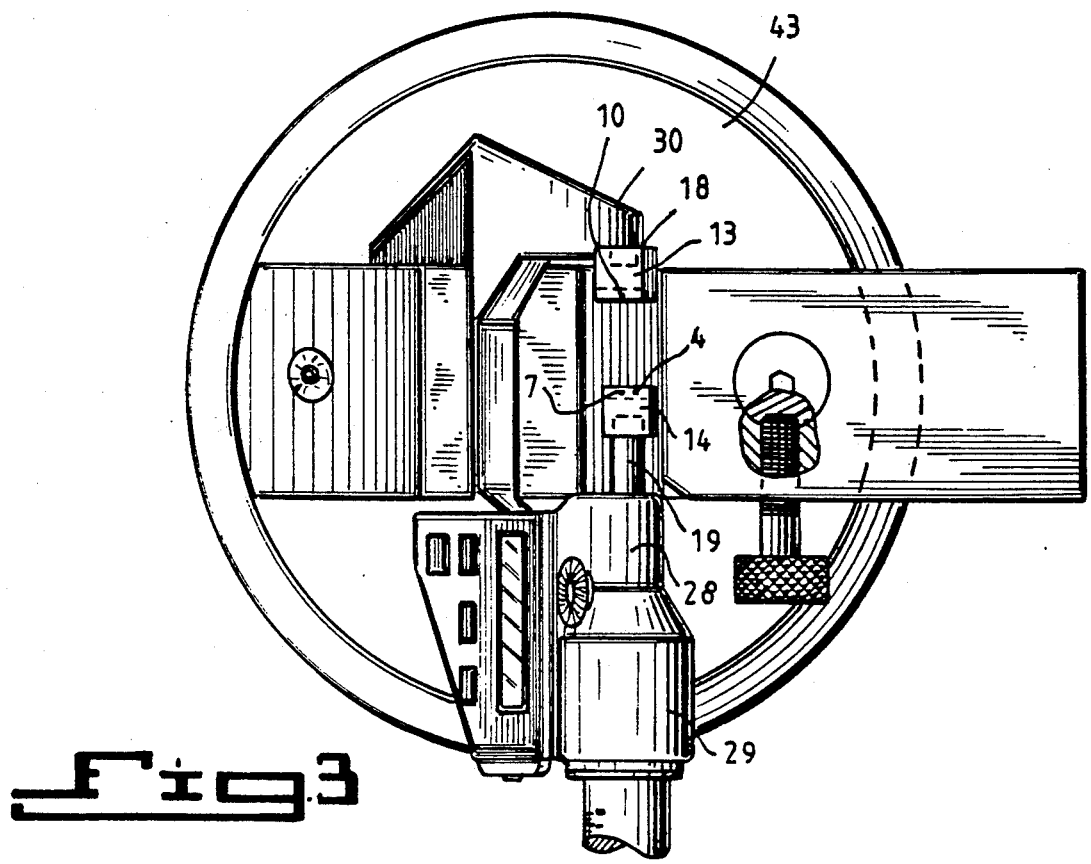
FIG. 3 is a top plan view of a portion of the apparatus of the present invention as shown in FIG. 1.

The preferred embodiment of the present invention is shown and described by way of example in FIGS. 1-13. In the drawing FIGS. 1-13 there is provided an apparatus for measuring the pitch diameter of screw threads, with the three-wire method, of a screw 2 having threads 2A, 2B, 2C, 2D respectively, wherein the pitch diameter is measured by pair of off-set wires 4 and 7, which are held against adjacent screw threads opposite to a single center wire 10. Reference numeral 3 designates the "pitch", of the linear distance from one screw thread to another.

Figure 12:
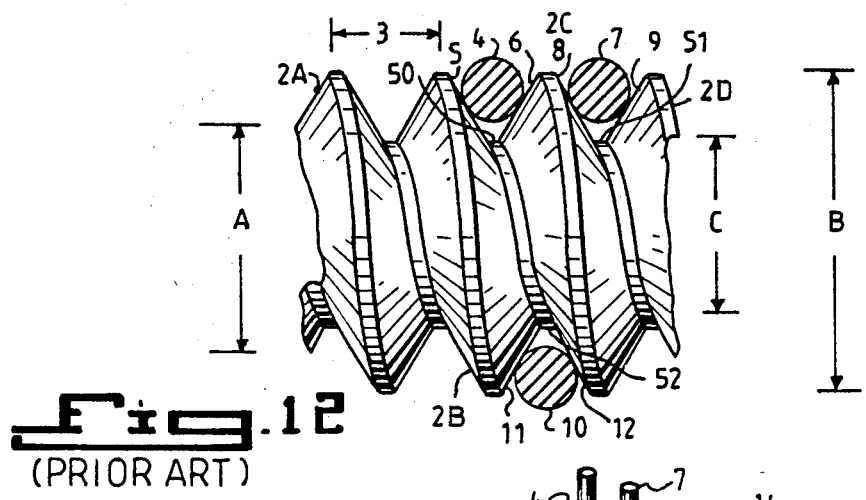
FIG. 12 is a close-up view of a typical screw with the pitch diameter of screw threads being measured by the present invention.
Figure 13:
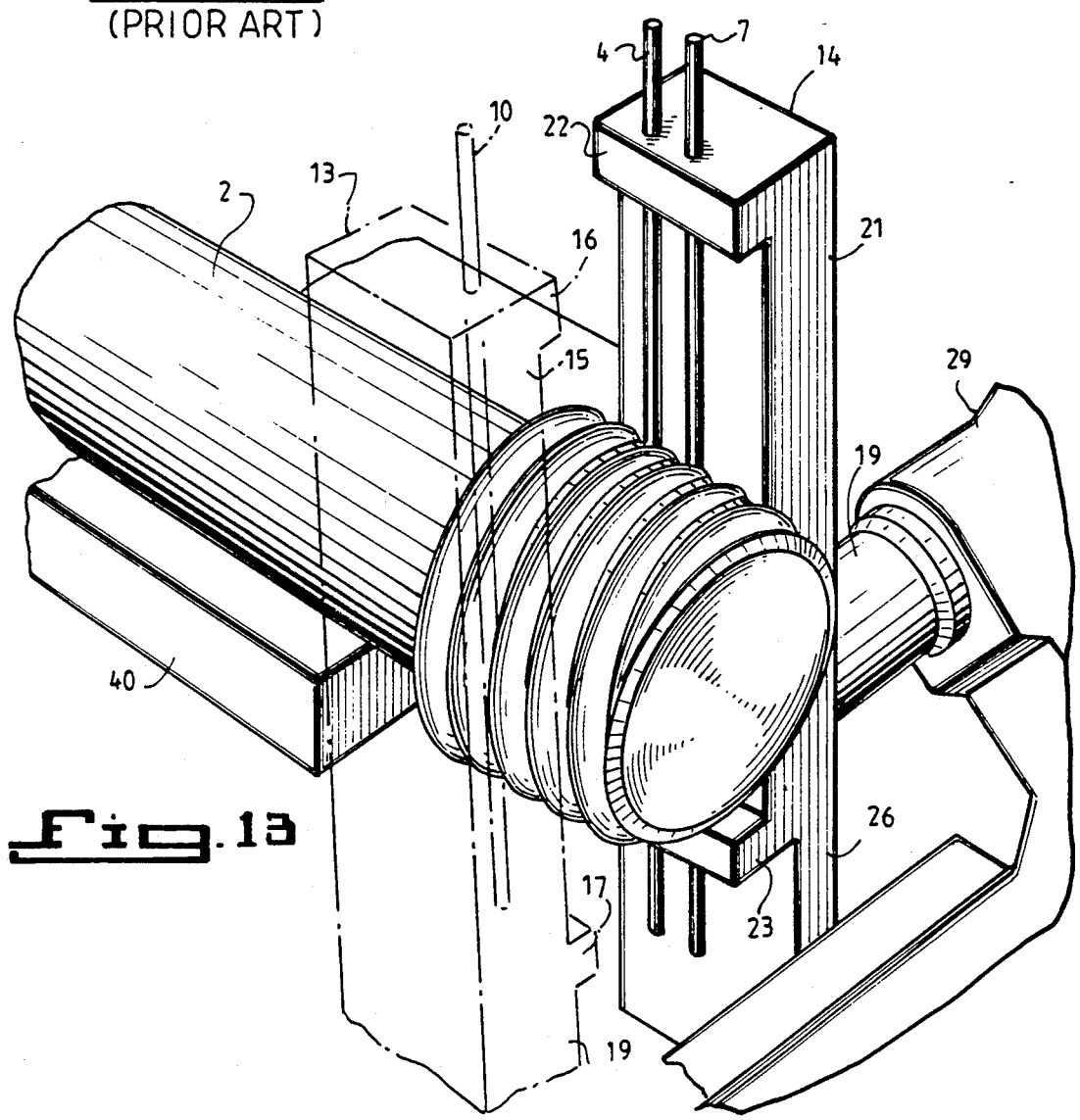
FIG. 13 is a close-up perspective view of the apparatus of the present invention as shown in FIG. 1.

As shown in FIG. 12, the pitch diameter of the threads of screw 2 is designated as A. The major diameter is designated as B, and the minor diameter is designated as C.

Wire 4 is held within the tapered wire contacting flank walls 5 and 6 of screw 2. Wire 7 is held in place within the tapered contacting flank walls 8 and 9 of the screw 2. The single center wire 10 is held in place within the tapered walls contacting flank walls 11 and 12 of the screw 2.

Single center wire 10 is held in place within wire holder ear 13 against the threads 2A, 2B, 2C, and 2D etc. of screw 2. Offset wires 4 and 7 are held in place by wire holder ear 14.

Since the wires 4,7 and 10 must engage the interior flank surfaces of the screw threads 2A, 2B, 2C or 2D, etc. in a position parallel to the lead angle of the screw threads 2A, 2B, 2C or 2D, etc., the wires are engaged perpendicular to the longitudinal axis of screw 2.

Wires 4, 7 and 10 are first placed the against the appropriate flanks of the screw threads being measured as holder 14 is moved by spindle 19 of micrometer 29. The wires 4, 7 and 10 are held firmly in a vertical orientation against the screw 2. If oriented vertically, the wires tend to stay still by the force of gravity. If they are held at an angle or horizontally, the force of gravity acts to subject the wires 4,7 or 10 to movement, which is contraindicated when precisely measuring the pitch diameter of screw threads.

As shown in FIGS. 1-13, wire 10 is held in place vertically against the appropriate flanks of the screw threads on an opposite side of the screw 2 within wire holder ear 13, which wire holder ear 13 includes main portion 15, having an upper cantilevered ledge extension portion 16 and a lower cantilevered ledge portion 17, extending in spaced relationship away from each other, and away from main portion 15, so that center wire 10 is held in place in hole 18 of upper cantilevered portion 16 and a correspondingly hole (not shown) within lower cantilevered portion 17.

A lower weighted tail portion 19 is located below cantilevered portion 17 to hold the wire holder ear portion 13 in a vertical orientation, such that weighted portion 19 is retracted down.

Wire holder ear 13 is held in place against contact 18A of anvil portion 30 of micrometer 29 abutting rear portion 20 of wire holder ear 13.

Conversely, wire holder ear 14 for wires 4 and 7 includes a main portion 21, above which is situated upper cantilevered portion 22, and below which is situated lower cantilevered portion 23, such that cantilevered portions 22 and 23 are positioned in spaced relationship away from each other to permit the holding of offset wires 4 and 7 parallel in place for measuring the screw threads of screw 2. A weighted tail portion 26 is disposed below the lower cantilevered portion 23 to facilitate the vertical orientation of the wire holder ear portion 14, as it is weighted down by lower tail portion 26.

The wire holder ear 14 for offset wires 4 and 7 is firmly held in place by an engaging spindle portion 19 rotatable within collar portion 28 of micrometer 29, having indicating display member 32 with indicia, by rotational movement of spindle 19 connected to micrometer rod 33, which rod 33 is movable by rotation of handle 34 for tightening of wire holder ear 14, disposed to spindle 19, against screw.

Preferably, the rotation of handle 34 controls a uniform force applied of wires 4,7 and 10 against screw threads 2A, 2B, 2C, 2D, etc. by a torque control built into handle 34.

Figure 4:
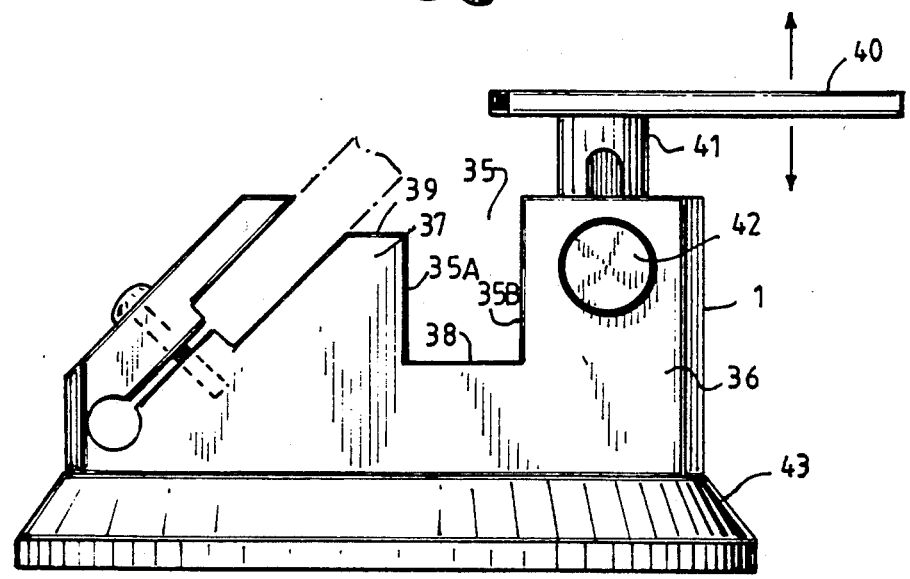
FIG. 4 is a side elevation view of the apparatus of the present invention as shown in FIG. 1.
Figure 4A:
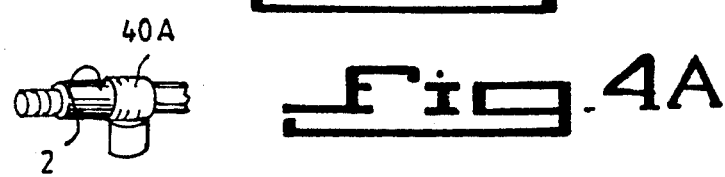
FIG. 4A is a closeup view of an alternate collar holder for the screw whose threads are being measured.

As shown in FIG. 4, the apparatus 1 includes a pedestal 36, having a generally horizontal ledge portion 39 and further having a vice jaw portion 37, within which micrometer 29 is held in place for measuring the pitch diameter of screw threads of screw 2.

A generally U-shaped recess 35 is indented within pedestal 36, and recess 35 is defined by vertical walls 35A and 35B extending upwardly from horizontal wall 38.

While drawing FIGS. 1-13 show single center wire holder ear 13 fixed in place by contact 18A against anvil 30 of micrometer 29 and wire holder ear 14 is rotatable about spindle 19 of micrometer 29, these two wire holder ears 13 and 14 are interchangeable, so that wire holder 14 may be alternately fixed in place by contact 18A against anvil 30 of micrometer 29 and wire holder ear 13 may conversely be rotatable about spindle 19.

While one wire holder, either wire holder ear 13 or 14, is held securely immobile by contact 18 against anvil portion 30 of micrometer 29, the other corresponding oppositely placed wire holder, either 13 or 14, is subject to a spinning movement about rotatable spindle 19 of micrometer 29. Therefore, recess 35 within pedestal 36 is provided to limit rotational movement of wire holder ear 13 or 14, so that the wire holder ear 13 or 14 will stay within a general vertical orientation, depending upon which wire holder ear 13 or 14 is attached to rotating spindle 19 of micrometer 29.

If rotation of spindle 19 causes the wire holder ear 13 or 14 to start to spin, the spinning motion of wire holder ear 13 or 14 is interrupted by contact of wire holder ear 13 or 14 against vertical wall 35A or 35B within recess 35.

To further facilitate the vertical orientation, the weighted portions 19 and 26 of wire holder ears 13 and 14 respectively, are at the bottom of wire holder ears 13 and 14, to insure the vertical orientation in conjunction with the force of gravity upon wire ear holders 13 or 14 disposed to rotatable spindle 19.

Therefore this vertical orientation of wire holder ear 13 or 14 is beneficial for accurate measurement with the wires 4, 7 and 10, since a horizontal orientation of the wires defies gravity and tends to cause an instability of the position of the wires, resulting in inaccurate measurements.

Since the wires 4,7 and 10 are preferably oriented vertically, the screw 2 is held perpendicular to the wires 4,7 and 10 in a generally horizontal orientation.

Because the wires 4, 7 and 10 are oriented vertically, the screw 2, with threads being measured, is held horizontally by a holding means, such as upon ledge portion 40 of pedestal 36, or within a holding collar 40A, which ledge 40 is movable upward by pedestal 41 controlled by tightening member 42 within pedestal 36 of the apparatus 1. A base, generally circular, designated as reference number 43, is provided to stabilize the holding of the micrometer in place during measurement of the screw threads 2A, 2B, 2C and 2D, etc.

It is noted that center wire 10 and offset wires 4 and 7 may become worn if they are held in place constantly over a period of time. Therefore, in order to accurately measure the pitch diameter of screw threads, the center wire 10 may be moved upward or downward within hole 18 of wire holder ear portion 13 until a unworn portion of wire 10 is found.

Similarly, offset wires 4 and 7 may be movable vertically within holes 24 and 25 of wire holder ear 14 to move the worn portion of the wires 4 and 7 away from any screws to be measured.

When the results are tabulated, they are calculated by computer calculator portion 44 disposed to a further display means 45. The input data is transferred from the micrometer 29 via cable 46 to the computer calculator portion 44, which displays the measuring pitch diameter data on display means 45 or prints it on printer 47.

In operation, the holder 14, having wires 4 and 7, is moved by rotational or horizontal movement of spindle 19, to dispose the wire holder ear 14 in such position that wires 4 and 7 are held generally vertically in place within the tapered wire engaging flank surface portions 5, 6, 8, 9, respectively, etc. of the screw threads, opposite the vertical wire 10 held in place within wire holder ear 14 against wire engaging flank surface portions 11 and 12 of the screw threads 2B and 2C.

While the wires 4 and 7 or 10 may not be vertical when they are being moved in place, as soon as they are at the proper position within the screw threads of the screw 2, having pitch diameter being measured, the wires snap into vertical alignment, which is further enhanced by the weighted portions 19 and 26 of wire holder ears 13 and 14 respectively.

As shown in FIGS. 12A-12J, another embodiment may be made to measure the minor diameter of screw threads of screw 2'. As noted before, the minor diameter is the diameter across the interior base of the threads, at the smallest portion of the screw thread cylinder. Since cylindrical wires 4,7 & 10 do not reach down to the bases 50, 51, 52 of screw thread 2A, therefore tapered pins 53,54 and 55 are utilized in a similar manner as pins 4,7 and 10 to measure the minor diameter.

As a further alternative, the tapered pins can be build into integral monoblocks 56 and 57, which are attached to contact portion 18 of anvil 30 and spindle 19 respectively. Monoblock 56 has a single linear protrusion 58 and monoblock 57 has two offset protrusions 59 and 60.

Moreover, as noted before, the wire holder ears 13 and 14 are limited in their rotational movement so they will not spin. They do not orient themselves in a horizontal orientation, as shown in the prior art Mahr Gage Company device which provides for holding the wires horizontally in an unstable position.

In contrast, the present invention holds the wires vertically so that the measurement can be accurately made of the pitch of the screw threads being measured.

It can be seen that the vertical orientation of wire holder ears 13 and 14 allows for accurate measurement of the screw threads of varying diameters.

While the present invention described in connection with the embodiment herein, it should be understood that other embodiments may be made without departing from the spirit in scope of the invention as noted in the appended claims:

I claim:

1. An improved measuring apparatus for utilizing the three wire method of measuring pitch diameter of screw threads of a screw, comprising:
    a plurality of at least three cylindrical wires, each said wire of said wires having an outer cylindrical surface capable of contacting a midpoint of a flank of each said screw thread of said screw threads between an outer edge and an inner edge of the screw thread, in a position, parallel to the lead angle of the screw thread,
    a base portion for holding a micrometer, a means to hold said wires in a generally vertical orientation during measurement, said means to hold said wires including a pair of wire holder ears for firmly holding said respective three wires, separately in place within said wire holders, said wire holder having ears removably attachable to said micrometer,
    said means to hold said wires including a means to limit a rotational movement from the application of rotational force against said wire holder ears for said wires,
    wherein said means to limit the rotation of said wires includes
    a generally U-shaped portion integral with said base portion, said U-shaped portion having a recess defining a restraining portion within which said wire holder ears are movable within a predetermined distance and further restrained in rotational movement outside of said predetermined distance.

2. The apparatus as in claim 1, wherein said means to limit the rotational movement of said wires comprises:
    said wire holding ears having respective weights at a lower bottom portion of said wire holder ears.

3. The apparatus as in claim 1, further comprising said wire holder ears each including a horizontally extending upper cantilevered portion with openings for each respective individual wire, said openings having predetermined spacing for insertion of each of said wires individually therein for measuring a specific thread pitch, said upper cantilevered portion being located in spaced relationship away from a lower cantilevered portion,
    said lower cantilevered portion having corresponding openings for each respective individual wire, said openings having corresponding predetermined spacing for insertion of each of said wires individually therein for also measuring the specific thread pitch,
    said openings firmly holding each said wires separately in place within each of said wire holders,
    said upper and lower cantilevered portions extending horizontally away from said main portion of said wire holder ears.

4. The apparatus as in claim 3 wherein said holder ears comprise first and second wireholder ears, the first wireholder ear having one first opening within one upper cantilevered portion and one second opening within one lower cantilevered portion, said one first opening in said upper cantilevered portion of said first wire holder ear for separate insertion of one cylindrical wire within said one first opening and said second opening and
    where said second holder ear has two further openings within a further upper cantilevered portion and two second openings within a further lower cantilevered portion for separate insertion of two of said cylindrical wires within said further upper and lower openings.

5. The apparatus as in claim 4 wherein said one screw thread measuring wire is movable axially within said first opening and said second opening.

6. The apparatus as in claim 1 further comprising a means for generally horizontally supporting said screw in spaced relationship away from said vertically oriented wire holder ears, said means holding said screw generally horizontally with respect to said vertically extending three wires for engaging said wires within said threads of said screw.

7. The apparatus as in claim 6, said means for horizontally supporting said screw being a ledge upon which said screw is supported.

8. The apparatus as in claim 6, said means for horizontally supporting said screw being a collar within which said screw is supported.

9. The apparatus as in claim 1, wherein each said wire is secured in place for engaging said screw threads, and a first wire holder ear of said wire holder ears being secured to a contact of an anvil portion of a micrometer for measuring said pitch diameter of said screw threads,
    a second wire holder ear of said wire holder ears being engaged to a rotatable spindle of said micrometer, said rotatable spindle responsive to rotational and longitudinal movement, said second wire holder ear responsive to moving at least one second wire in positional register contact with at least one flank surface of said screw threads, while said second wire holder ear is in a generally vertical orientation and, means for holding said screw in a generally horizontal position, said base portion including a pedestal, said pedestal having said recess therein, said at least one second wire within said second wire holder ear movable about said spindle within said recess, said recess defined by at least two generally vertically extending walls and one generally horizontal wall, said generally vertically extending walls limiting movement of said rotational movement of said second wire holder ear within said predetermined distance of said recess.

10. The apparatus as in claim 9 wherein said pedestal base includes a vice jaw portion said vice jaw portion holding said micrometer in place for measuring said pitch diameter of said screw threads.

11. The apparatus as in claim 9, wherein said holding means is a collar.

12. The apparatus of claim 10 wherein said means for holding said screw in a horizontal position includes a horizontal ledge.

13. The apparatus as in claim 1 wherein at least one of said wires is movable toward at least one of said screw threads by a rotational means in said micrometer, said rotational means being a handle controlling a uniform force applied by said at least one wire against at least one screw thread, said rotational means including a torque control disposed to said handle.

14. An improved measuring apparatus for utilizing the three wire method of measuring pitch diameter of screw threads of a screw, comprising:

a plurality of at least three cylindrical wires, each said wire of said wires having an outer cylindrical surface capable of contacting a midpoint of a flank of each said screw thread of said screw threads between an outer edge and an inner edge of the screw thread, in a position parallel to the lead angle of the screw thread, a base portion for holding a micrometer, a means to hold said wires in a generally vertical orientation during measurement, said means including a pair of wire holder ears for firmly holding said respective three wires, separately in place within said wireholders, said wireholder ears removably attachable to said micrometer, said holders for said wires including a means to limit a rotational movement from the application of rotational force against said wire holder ears for said wires, a means for generally horizontally supporting said screw in spaced relationship away from said vertically oriented wire holder ears, said means for holding said screw permitting said vertically extending three wires to engage said threads of said screw, wherein said means to limit the rotation of said wires includes a generally U-shaped portion integral with said base portion, said U-shaped portion having a recess defining a restraining portion within which said wire holder ears are movable within a predetermined distance and further restrained in rotational movement outside of said predetermined distance.

15. The apparatus as in claim 14, wherein said means to limit the rotational movement of said wires comprises:

said wire holding ears having respective weights at a lower bottom portion of said wire holder ears.

16. The apparatus as in claim 14, further comprising said wire holder ears each including a horizontally extending upper cantilevered portion with openings for each respective individual wire, said openings having predetermined spacing for insertion of each of said wires individually therein for measuring a specific thread pitch, in spaced relationship away from a lower cantilevered portion, said openings firmly holding each said wires separately in place within each of said wire holders, said upper and lower cantilevered portions extending horizontally away from said main portion of said wire holder ears.

17. The apparatus as in claim 16 wherein said wireholder ears comprise first and second wire holder ears, the first wire holder ear having one first opening within one upper cantilevered portion and one second opening within one lower cantilevered portion, said one first opening in said upper cantilevered portion for separate insertion of one of said cylindrical wires within said one first opening and said one second opening and where a second holder ear has two further openings within a further upper cantilevered portion and two second openings within a further lower cantilevered portion for separate insertion of two of said cylindrical wires within said further upper and lower openings.

18. The apparatus as in claim 17 wherein said one cylindrical wire is movable axially within said first opening and said second opening.

19. The apparatus as in claim 14, said means for horizontally supporting said screw being a ledge upon which said screw is supported.

20. The apparatus as in claim 14, said means for horizontally supporting said screw being a collar within which said screw is supported.

21. The apparatus as in claim 14, wherein each said wire is secured in place for engaging said screw threads, and a first wire holder ear of said wire holder ears being secured to a contact of an anvil portion of a micrometer for measuring said pitch diameter of said screw threads, a second wire holder ear of said wire holder ears being engaged to a rotatable spindle of said micrometer, said rotatable spindle responsive to rotational and longitudinal movement, said second wire holder ear responsive to moving at least one of said wires in positional register contact with at least one flank surface of said screw threads, while said second wire holder ear is in a generally vertical orientation and, said base portion including a pedestal, said pedestal having said recess therein, said at least one of said wires within said second wire holder ear movable about said spindle within said recess, said recess defined by at least two generally vertically extending walls and one generally horizontal wall, said generally vertically extending walls limiting movement of said rotational movement of said second wire holder ear within said predetermined distance of said recess.

22. The apparatus as in claim 21 wherein said pedestal base includes a vice jaw portion said vice jaw portion holding said micrometer in place for measuring said pitch diameter of said screw threads.

23. The apparatus as in claim 21, wherein said means for holding said screw in a horizontal position includes a horizontal ledge.

24. The apparatus as in claim 14 wherein at least one of said wires is movable toward at least one of said screw threads by a rotational means in said micrometer said rotational means being a handle controlling a uniform force applied by said at least one wire against at least one screw thread, said rotational means including a torque control disposed to said handle.

* * * * *